United States Patent [19]

Cheong et al.

[11] Patent Number: 5,584,013
[45] Date of Patent: Dec. 10, 1996

[54] HIERARCHICAL CACHE ARRANGEMENT WHEREIN THE REPLACEMENT OF AN LRU ENTRY IN A SECOND LEVEL CACHE IS PREVENTED WHEN THE CACHE ENTRY IS THE ONLY INCLUSIVE ENTRY IN THE FIRST LEVEL CACHE

[75] Inventors: Hoichi Cheong, Austin; Dwain A. Hicks, Pflugerville; Kimming So, Austin, all of Tex.

[73] Assignee: International Business Machines Corporation, Armonk, N.Y.

[21] Appl. No.: 353,010

[22] Filed: Dec. 9, 1994

[51] Int. Cl.⁶ .......................... G06F 12/12; G06F 13/00
[52] U.S. Cl. .................. 395/449; 395/446; 395/448; 395/451; 395/457; 395/463; 364/243.45; 364/246.12; 364/964.343; 364/966.2; 364/DIG. 1; 364/DIG. 2
[58] Field of Search .................................. 395/446, 448, 395/449, 451, 457, 463; 364/243.45, 964.343, 966.2, 246.12

[56] References Cited

U.S. PATENT DOCUMENTS

| | | | |
|---|---|---|---|
| 4,464,712 | 8/1984 | Fletcher | 395/449 |
| 4,636,946 | 1/1987 | Hartung et al. | 395/463 |
| 5,023,776 | 6/1991 | Gregor | 395/449 |
| 5,140,690 | 8/1992 | Hata et al. | 395/463 |
| 5,155,828 | 10/1992 | La Fetra et al. | 395/449 |
| 5,155,832 | 10/1992 | Hunt | 395/447 |
| 5,202,972 | 4/1993 | Gusefski et al. | 395/450 |
| 5,214,765 | 5/1993 | Jensen | 395/449 |
| 5,222,222 | 6/1993 | Mehring et al. | 395/417 |
| 5,265,232 | 11/1993 | Gannon et al. | 395/451 |
| 5,276,848 | 1/1994 | Gallagher et al. | 395/448 |
| 5,386,547 | 1/1995 | Jouppi | 395/449 |

*Primary Examiner*—Frank J. Asta
*Attorney, Agent, or Firm*—Mark E. McBurney; Andrew J. Dillon

[57] ABSTRACT

The present invention provides balanced cache performance in a data processing system. The data processing system includes a first processor, a second processor, a first cache memory, a second memory and a control circuit. The first processor is connected to the first cache memory, which serves as a first level cache for the first processor. The second processor and the first cache memory are connected to the second cache memory, which serves as a second level cache for the first processor and as a first level cache for the second processor. Replacement of a set in the second cache memory results in the set being invalidated in the first cache memory. The control circuit is connected to the second level cache and prevents replacing from a second level cache congruence class all sets that are in the first cache.

17 Claims, 7 Drawing Sheets

HIERARCHICAL CACHE ARRANGEMENT WHEREIN THE REPLACEMENT OF AN LRU ENTRY IN A SECOND LEVEL CACHE IS PREVENTED WHEN THE CACHE ENTRY IS THE ONLY INCLUSIVE ENTRY IN THE FIRST LEVEL CACHE

BACKGROUND OF THE INVENTION

1. Technical Field

The present invention is related generally to an improved data processing system, and in particular to a method and system for improving cache performance in a data processing system. Still more particularly, the present invention is related to a method and apparatus for improved use of a cache shared between two processors in a data processing system.

2. Description of the Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicates the number of locations an address can reside) in a congruence class in a set associative cache. More information on cache memories may be found in Stone, *High-Performance Computer Architecture,* Addison-Wesley Publishing Company, 1987.

Connecting a number of processors to a common cache memory hierarchy may result in poor performance when the processors accesses to a cache behave differently and the replacement policy employed on the cache cause performance degradation to some processors. The same problems may occur when different types of processors having different access schemes are connected to a common cache memory hierarchy. Therefore, it would be advantageous to have an improved method and apparatus for providing balanced cache performance in a cache memory system that contains two or more processors sharing a common memory hierarchy.

SUMMARY OF THE INVENTION

An object of the present invention is to provide an improved data processing system and It is another object of the present invention to provide a method and apparatus for improving cache performance in a data processing system.

It is another object of the present invention to provide a method and apparatus for improved use of a cache shared between two processors in a data processing system.

The present invention provides balanced cache performance in a data processing system that includes a first processor, a second processor, a first cache memory, a second cache memory, and a control circuit. The first processor is connected to a cache memory, which serves as its first level cache herein referred to as the first cache memory. The combination of this first processor and the first cache memory will herein be referred to as the first processing element. The second processor which will herein be referred to as the second processing element and the first processing element are connected to the second cache memory, which serves as a dual-purpose cache. This second cache memory serves as a second level cache for the first processing element and as a first level cache for the second processing element. All lines of data in the first cache memory also are found in the second cache memory. Replacement of a set in the second cache memory results in the copy of the line in the first cache memory being purged in the first cache memory. A second level cache memory is said to have level one inclusion if it has a copy of all data in the level one cache. The control circuit is connected to the second level cache and, for each congruence class in the second level memory, the control circuit prevents the purging of a set in this congruence class when accessed by the second processing element if the set is the only member of the congruence class that is contained in the first level cache attached to the first processing element. In other words, the present invention prevents replacement of any set of a congruence class with a level one inclusion in the first cache memory if the set is the only set inclusive in the first level cache. The first processor may be a main processor such as a central processing unit, which employs instruction and data accesses. The second processor may be, for example, a numeric processor, which only employs data accesses.

The above as well as additional objectives, features, and advantages of the present invention will become apparent in the following detailed written description.

BRIEF DESCRIPTION OF THE DRAWINGS

The novel features believed characteristic of this invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
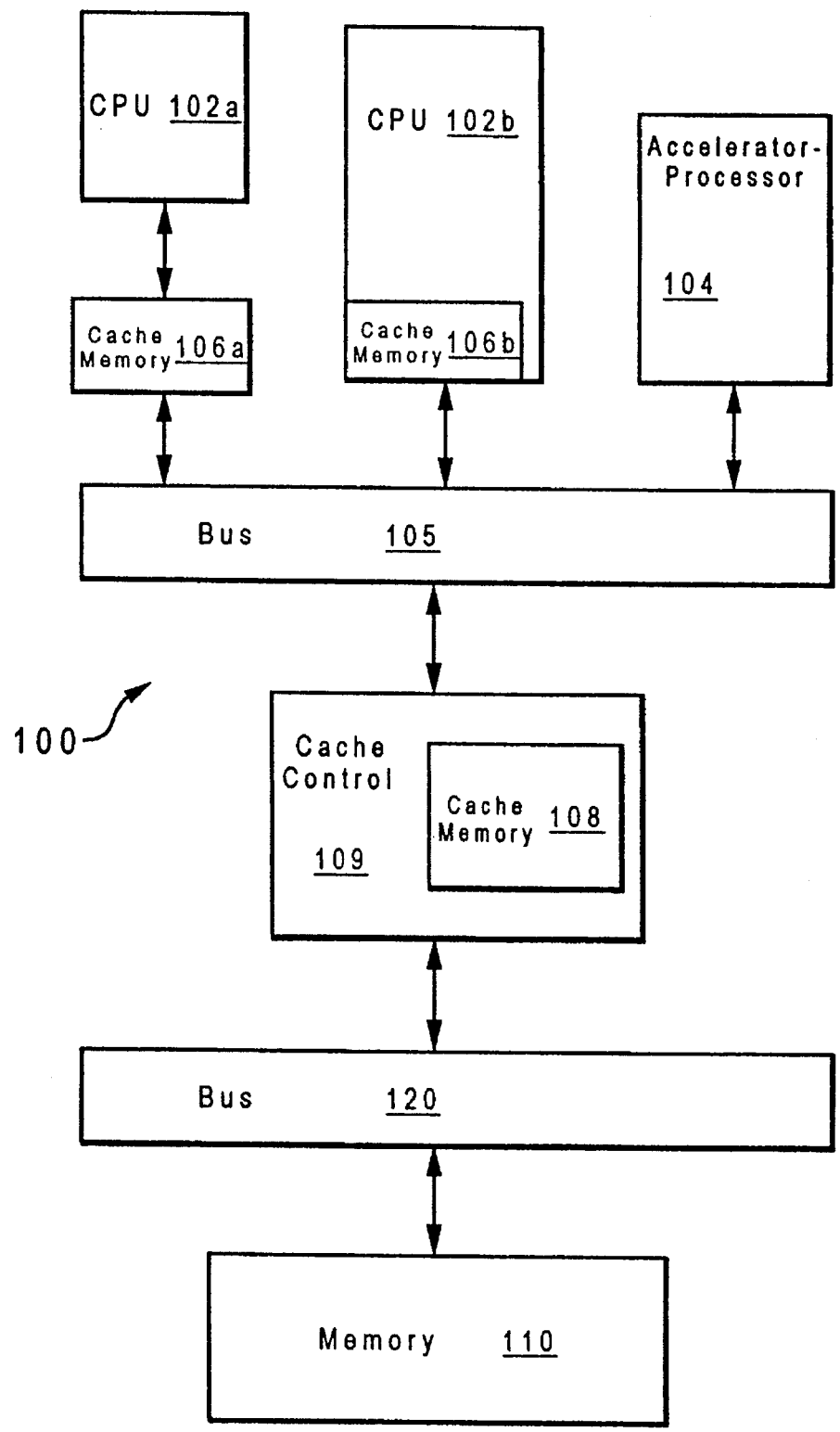
FIG. 1 is a block diagram of a data processing system in accordance with a preferred embodiment of the present invention.

With reference now to the figures and in particular with reference to FIG. 1, a block diagram of a data processing system 100 is illustrated in accordance with the preferred embodiment of the present invention. Data processing system 100 includes CPUs 102a and 102b, and processor 104 which is a numeric processor in accordance with a preferred embodiment of the present invention. CPUs 102a and 102b have cache memories 106a and 106b, respectively. These two cache memories in turn are connected to cache memory 108 by bus 105 or some other interconnection media. Processor 104 also is connected to cache memory 108 through some interconnection network. Memory 110 is connected to cache memory 108 by a bus 120 or some other interconnection media.

To support special purpose processing, for example numeric intensive application or high speed video, a high performance computer system provides a computation node with a general purpose processor, such as CPU 102a incorporated with a special purpose processor or accelerator processor such as processor 104. The high performance computer system also may provide a multi-processor ("MP") configuration using multiple nodes (CPUs 102a and 102b). To provide satisfactory memory bandwidth and to reduce memory access latency, memory cache 108 is configured as a dual-purpose cache and is controlled by cache control logic 109. Cache memory 108 functions as a second level cache for CPUs 102a and 102b and as a first level cache to processor 104. In addition, this cache memory also would function as a second level cache for processors in a MP configuration without the accelerator processor, assuming each such processor had its own first level cache.

The "inclusion property" is preserved in the memory hierarchy, between cache memories 106a and 106b and cache memory 108, for efficient cache coherence maintenance. The inclusion property requires that a copy of a first level L1 directory entry in cache memory 106a or 106b must also reside in cache memory 108 as a L2 directory entry. Under the inclusion property, replacement of an entry in a second level cache requires removal of the copy of that entry in the first level cache. The inclusion property is described in more detail with respect to FIG. 5 below. A "replacement" occurs to make space for new data brought in from memory 110 in response to a miss in cache memory 108 from a request initiated by a processor. From the "replacement" of the old line in cache memory 108, the copy of the old line in the first level cache, cache memory 106a or 106b, is removed. In multiprocessor systems, when several processors with first level cache share data, the cache control logic 109 can filter out most unnecessary requests to the first level cache since an external request to the second level cache that results in a miss in the cache need not be sent to the first level cache.

Problems may arise using cache memory 108 as a second level cache for CPU 102a and 102b and as a first level cache for processor 104 because the replacement policy of this dual-purpose cache, cache memory 108, is required to meet conflicting objectives of a first level and second level cache at the same time. Further complications may occur as a result of the different access behavior by cache memory 106a or 106b, which typically includes instruction and data accesses, and processor 104, which as a numeric processor employs only data accesses.

To function as a first level cache to processor 104, frequent accesses of long arrays by processor 104 would tend to replace every set in a congruence class in cache memory 108 frequently regardless of whether the sets have a copy in first level cache memory 106a or 106b. This is described in more detail with respect to FIGS. 6A–6E below. Under the inclusion property, premature removal of first level entries could be forced by the data references generated by processor 104. This result in the occurrence of a large number of unnecessary misses in cache memories 106a and 106b caused by processor 104 accesses. As a result, performance in data processing system 100 may suffer.

On the other hand, when cache memory 108 functions as a second level cache for CPUs 102a and 102b, cache memory 108 employs a replacement policy preferring replacement of cache entries not residing in cache memory 106a or 106b. Such a policy results in minimizing traffic between cache memories 106a and 106b and cache memory 108 and increase the hit ratio in cache memories 106a and 106b. However, processor 104 can effectively use only a limited portion of cache memory of 108 when it is configured as a dual-purpose cache because new memory data loaded in by processor 104 has the highest probability of being replaced under the replacement policy of cache memory 108 acting as a second level cache for CPU 102a and 102b.

The present invention provides a method and apparatus in which each congruence class of cache memory 108 manages to retain some first level entries of cache memories 106a and 106b while allowing processor 104 to effectively use cache memory 108. In accordance with a preferred embodiment of the present invention, the replacement policy employed for a set associative cache memory 108 configured as a dual-purpose cache seeks to preserve at least one set (i.e., one second level cache line) of each congruence class for first level cache inclusion. In other words, complete replacement of all sets with first level cache inclusion in an addressed congruence class, in cache memory 108 is prevented when data request occur from processor 104. This is done by not selecting a set for replacement if it is the only set for which first level cache inclusion exists. If no set has first level cache inclusion then the proposed scheme reduces to a traditional LRU replacement algorithm. In accordance with a preferred embodiment from the present invention, a four-way set associative second level cache is employed with a replacement policy that incorporates a least recently used "LRU" policy. In a four way set associative cache, each congruence class has cache entries in at most four sets. The LRU policy selects the least recently used set of the addressed congruence class for replacement. Of course, the present invention may be applied to other set associative configurations, such as an eight-way set associative, second level cache.

The replacement policy of cache memory 108 according to the present invention services a miss from a processor as follows:

If the LRU set is the only one with first level cache inclusion in the congruence class select the next LRU set to replace.

else select the LRU set to replace.

When a request from a numeric processor, such as processor 104, results in a miss in cache memory 108, the present invention guarantees not to replace the only second level cache/first level cache entry with the second level cache inclusion in any congruence class. In addition, processor 104 is not confined to using only one set of the cache since at least three of the sets are available for its use. According to a preferred embodiment of the present invention, the replacement policy according to the present invention, may be applied to either or both CPUs 102a and 102b or processor 104.

Figure 2:
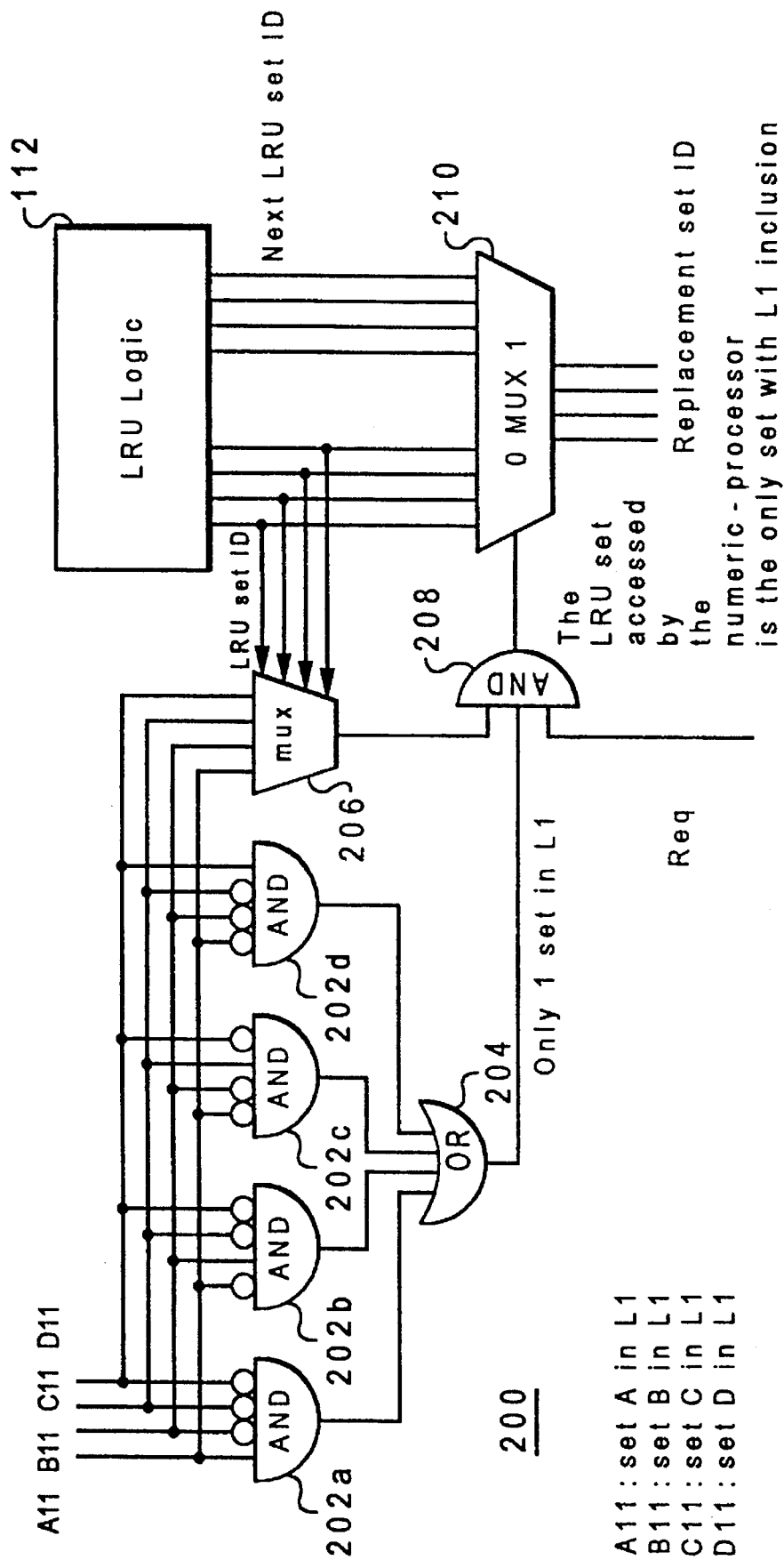
FIG. 2 is a diagram of the logic employed to determine the set to be replaced in response to a miss in accessing a dual-purpose cache.

Referring now to FIG. 2, a diagram of the logic employed to determine the set to be replaced is illustrated in accordance with the preferred embodiment of the present invention. The depicted example in FIG. 2 shows how the replacement policy of the present invention operates with respect to servicing a miss from processor 104. Processor 104 accesses can have the greatest tendency to replace all cache lines of a congruence class. Again, the process depicted in this figure also may be applied to accesses from CPUs 102a and 102b. Thus, the present invention is not limited to accesses only from a single processor.

Control circuit 200 includes AND gates 202a–202d. These logic gates each have four inputs, AI1, BI1, CI1, and DI1, which respectively indicate whether the four sets of the addressed congruence class (sets A, B, C, and D respectively) reside in the first level cache. The inclusion status are stored in cache as described in FIG. 3. The logical true input of each of the four AND gates denotes that the entry in a specific set (A, B, C, or D) is the only one in the congruence class with first level cache inclusion. The outputs of AND gates 202a–202d are ORed together and the logical true output of the OR gate denotes the condition that only one entry out of the four entries has first level cache inclusion. Multiplexer 206 is used to select the inclusion bit of the next set to be replaced in the addressed congruence class. The output of multiplexer 206 and OR gate 204 are input to AND gate 208 along with a signal indicating a numeric request from processor 104 to create an output with the logical true condition indicating that the LRU set selected for replacement is the only set with an entry with first level cache inclusion in the addressed congruence class. When it is true, multiplexer 210 selects the next LRU set ID from the LRU Logic 112 as the replacement set ID. Otherwise, the LRU set ID selected remains the normal replacement set ID. LRU logic 112 produces replacement set IDs and is well known to those of ordinary skill in the art. LRU logic 112 normally generates the ID of the least-recently-used set of the addressed congruence class. In accordance with the preferred embodiment of the present invention, an additional ID is generated by LRU logic 112. This additional ID is the next-LRU-set ID. LRU logic 112 consists of a storage unit that contains as many entries as the number of congruence classes in the cache for which the LRU logic 112 keeps the order of accesses to the sets in each class. Each LRU storage entry corresponds to a particular congruence class in the cache and keeps the order in which each set in that particular class has been accessed. When a set is accessed, the storage is updated to reflect the change in reference order. Each time a replacement is required, the LRU storage entry for that congruence class is retrieved and the LRU set is determined. Since the complete order of the set is stored, the next least-recently-used set can also be determined. The LRU set ID and the next LRU set ID are inputs to multiplexer 210 which generates the replacement set ID based on the value of and 208. This set is then replaced if it is determined that the access is a miss and new data needs to be brought into the cache.

Figure 3:
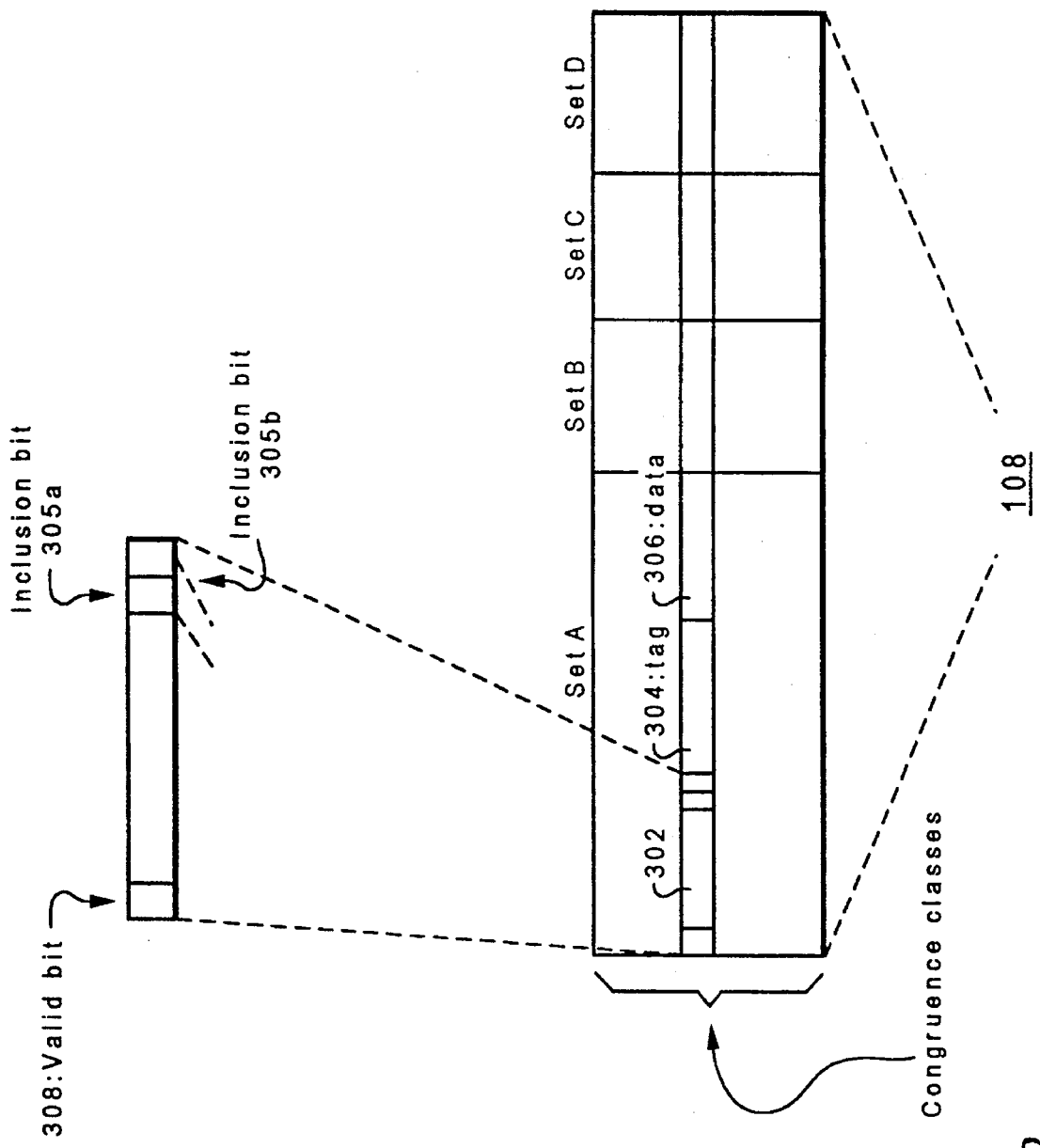
FIG. 3 is an example of a directory entry in a cache according to the present invention.

In FIG. 3, memory 108 depicts the organization of the shared cache that serves as second level cache to individual CPUs that have their own first level cache and as a first level cache to other accelerator-processors that have no first level caches. Memory 108 is shown logically organized as an assembly of congruence classes with four way set associativity. By n-way set associativity (n=4 in this case), each congruence class contains four cache lines each of which has a data portion 306, a tag 304, and a status portion 302 with miscellaneous bit fields, valid bit 308 to indicates a valid cache line and inclusion bits 305a and 305b to indicate whether the cache line resides in any of the CPU's first level caches that share cache memory 108. Valid bit 308 is a logic 1 when the line is in the second level cache and is a logic 0 when the line is not in the second level cache. Inclusion bit 305a is a Logic 1 when the line is present in the first level cache of the processor corresponding to inclusion bit 305a. Otherwise, inclusion bit 305a is a logic 0 when the line is not in the first level cache of the processor corresponding to inclusion bit 305a. Similarly, inclusion bit 305b is a logic 1 when the line is in the first level cache of the processor corresponding to this bit. Inclusion bit 305b is a logic 0 when the line is not in the first level cache of the processor corresponding to this bit. The tag and the status portion of each of the cache lines constitute the directory portion of cache memory 108, which is separate from the data portion. Physically, the directory portion and the data portion do not have to share the same physical memory modules that make up cache memory 108. A cache line in cache memory 108 belongs to one of the sets, A, B, C or D depending on the physical location the cache line residing in the memory module. The set ID and the unique congruence class index pinpoint the exact location of a cache line in memory 108.

Figure 4:
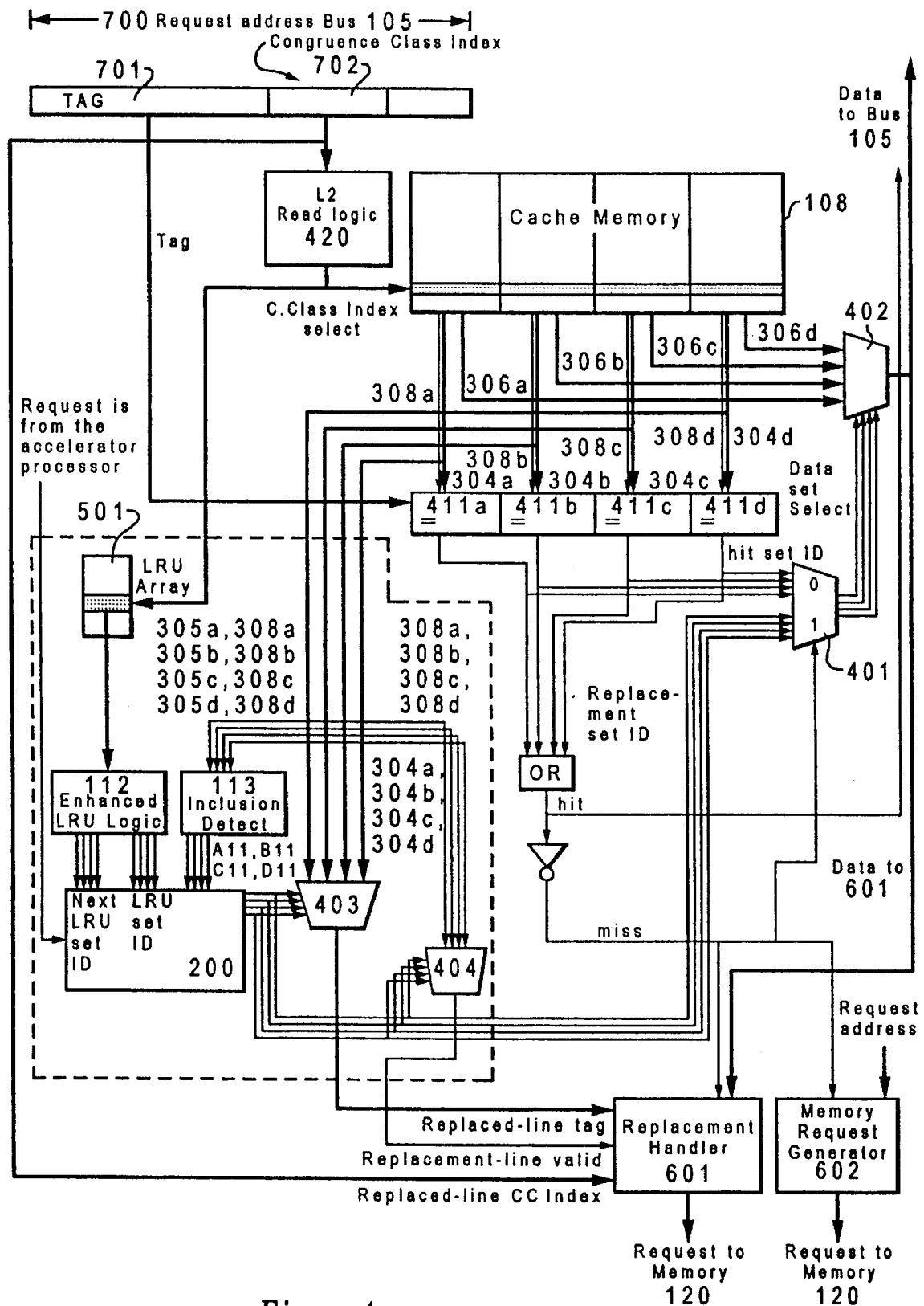
FIG. 4 is a more detailed diagram of a cache control unit.

FIG. 4 depicts the general relation between the access logic, control logic 200 and the replacement handler logic 601. These are the parts of the logic that constitute cache control 109 in FIG. 1.

A request from one of the CPU's first level caches or the accelerator processor to cache memory 108 consists of a request address 700. Part of request address 700, congruence class index 702, is used by the second level cache read logic 420 to access one of the congruence classes in cache memory 108 and the corresponding congruence class in LRU array 501. The tags, 304a, 304b, 304c, and 304d and the status portion of each of the cache lines in the congruence class are retrieved and the tags compared to the tag portion 701 of the request address. A valid line in the cache which has the same tag as the requested address indicates a cache hit which generates the select to Multiplexer (MUX) 401 which then selects the hit set ID to select one of the data lines by MUX 402. The selected data from the second level cache is delivered to the requester upon a cache hit via bus 105.

When none of the valid cache line tags in the congruence class match the request tag, a miss is said to occur and address 700 and the miss signal are sent to Memory Request Generator 602. A request will then be generated to memory 120 to fetch the missed line. When the line is returned from memory 120, the second level cache needs to find a set in the addressed congruence class to store the line. If all the sets of the addressed congruence class are occupied, one set will be selected and the valid line in it will be replaced. The present invention aids in selecting a line to be replaced. Upon the detection of the miss, the status bit 305 (2 status bits) are used to generate the LRU set ID and the next LRU set ID. AI1, BI1, CI1, and DI1, the LRU set ID, and the next LRU set ID will be used by control circuit 200. Control circuit 200 generates the Replacement Set ID, which selects the set of the addressed congruence class for storing the line being returned from the memory. In case valid modified data exists in this set, the select line to MUX 401 will select the Replacement Set ID which in turn gates the data of the replacement set from the congruence class through MUX 402. The Replacement Set ID is also used to select (via MUX 403) the tag of the replaced line, and to generate the Replacement line valid signal (via MUX 404). The replaced-line tag, the congruence class index, the Replacement line valid signal and the data selected by the Replacement Set ID will be used by logic to handle the replacement.

Inclusion detect Logic 113 uses inputs 305a and 308a to produce signal AI1, 305b, and 308b to produce signal BI1, 305c and 308c to produce signal CI1, 305d and 308d to produce signal DI1. When one of the outputs is true (AI1, BI1, CI1, DI1), it implies that its corresponding valid bit 308 (a, b, c, or d) is true and the line is in first level cache of the corresponding lines in set a, b, c, or d. For a system with a single first level cache, signals 305a, 305b, 305c, and 305d are all single bits, and their true state indicates the line is in the first level cache. For a system with multiple first level caches, the true states are detected by the logic OR of the corresponding multiple bits of 305a, 305b, 305c, and 305d. (i.e., signals 305a, 305b, 305c, and 305d are logic or of several bits each indicating inclusion in a first level cache).

Each block 411a–411d detects whether the tags 304a–304d of the valid second level cache lines in the corresponding sets match the tag portion of the request address. If a match is present, the request hits the line in the corresponding set, and the output of the block is a logic one.

Replacement handler 601 takes the tag of the line to be replaced, the congruence class index of the request address, the valid bit of the selected line, and the miss signal as inputs. When the miss signal from replacement handler 601 is true, and the selected line is a valid line, the replacement handler will generate a request to the memory to inform memory about the replacement of the selected line. The line address of the replaced line, consisting of the tag and the congruence class index, will be sent to memory along with the request. Replacement handler 601 will also send to the memory the data portion of the selected line if a modification has been performed to the line by the processor or first level caches.

Figure 5:
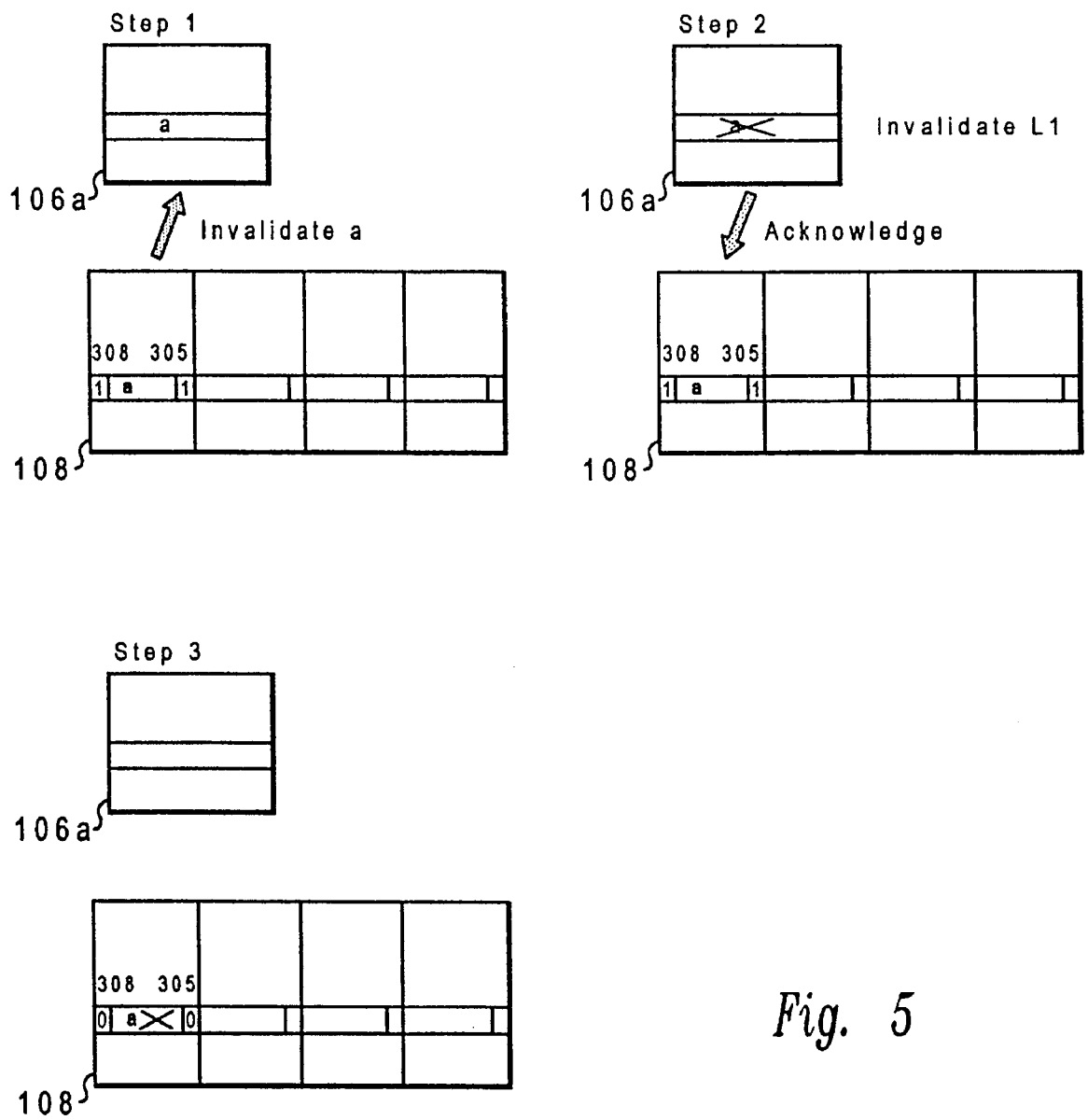
FIG. 5 is a diagram illustrating the use of an inclusion bit in a replacement line from an L2 cache.

FIG. 5 illustrates the operations involved when a line with first level cache inclusion is replaced. Only the tag portion and the inclusion bit portion of the directory in cache memory 108 are shown for simplicity. In FIG. 5, the set inclusion bit corresponding to cache memory 106a indicates that line a is in cache memory 106a. If line a is selected to be replaced, the replacement handler logic of cache memory 108 will need to send a request to purge the line in cache memory 106a. The purging of line a in a first level cache can be caused by a miss due to an access from accelerator processor 104.

In step 1 of FIG. 5, cache memory 108 acts as a second level cache and sends a request to replace line a in cache memory 106a. In step 2, cache memory 106 purges its line and acknowledges cache memory 108. Thereafter, in step 3, cache memory 108 purges line a and proceeds to notify memory 110 of the purges.

When cache memory 108 functions as an first level cache to accelerator processor 104 and when a set is occupied by data or instructions used by a cache 106, repeated accesses by accelerator processor 104 in the same congruence class will cause all lines in that congruence class to be replaced and the copies in cache 106 to be purged. When a CPU, attached to cache 106a such as CPU 102a, needs these lines subsequently, the accesses will miss both cache 106a and cache memory 108. Such occurrences are common when accelerator processor 104 accesses a long array, such as in numerical or video operations.

Figure 6A:
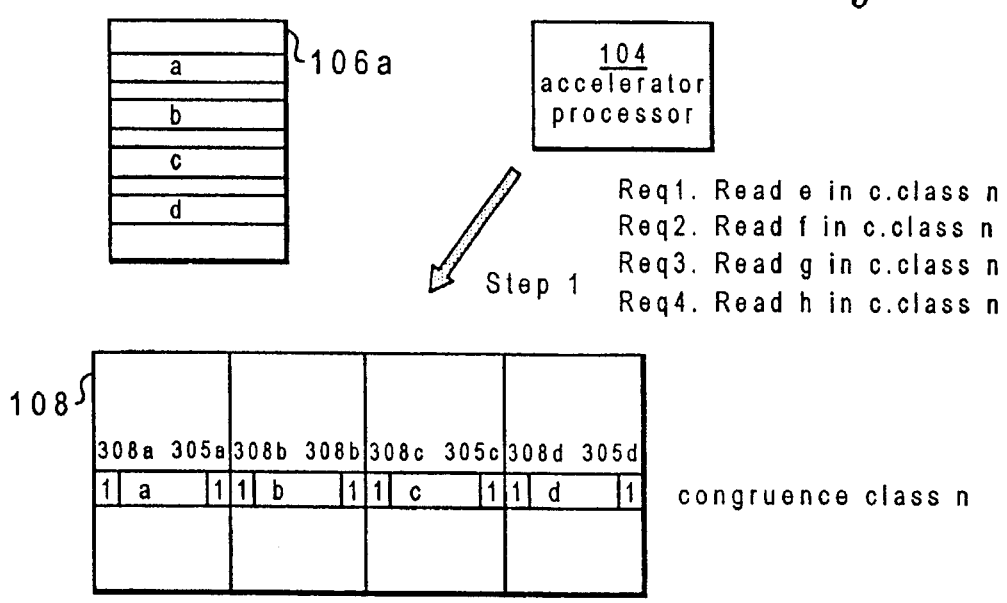
FIGS. 6A–6C illustrate replacement of an entire congruence class of data and instruction in an L1 cache by an accelerator processor.
Figure 6B:
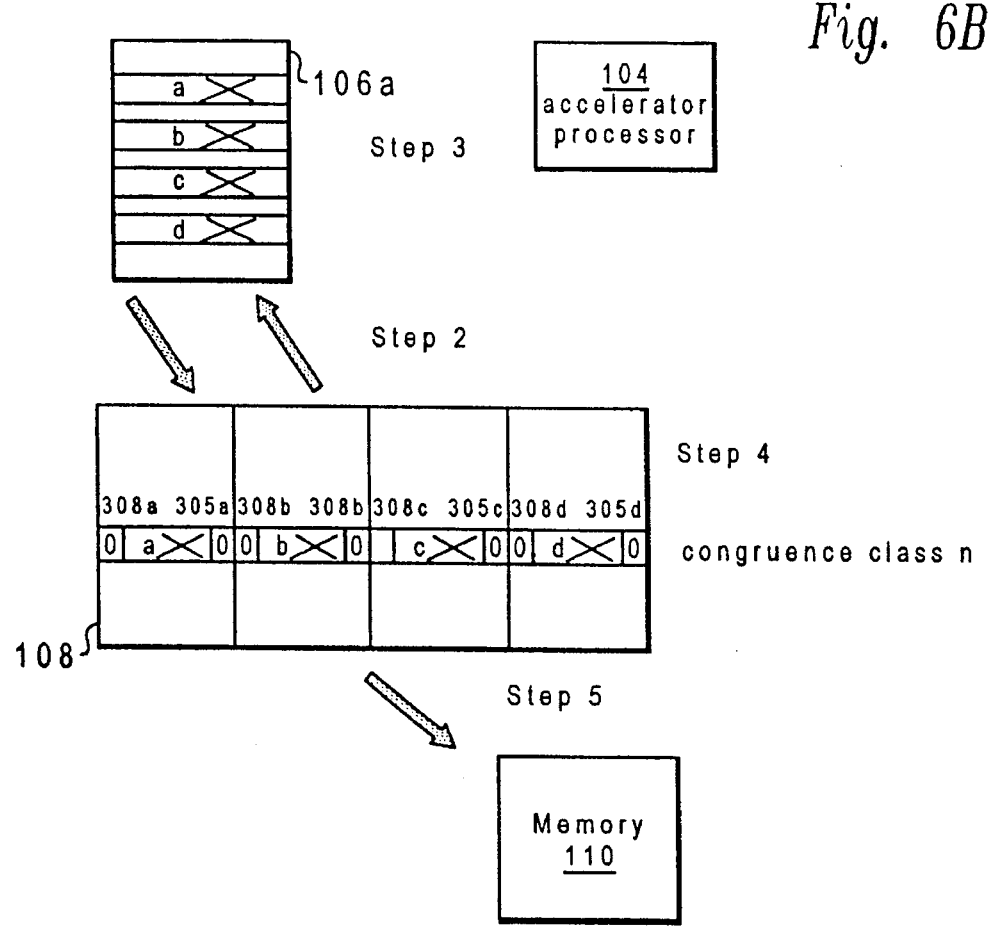
Figure 6C:
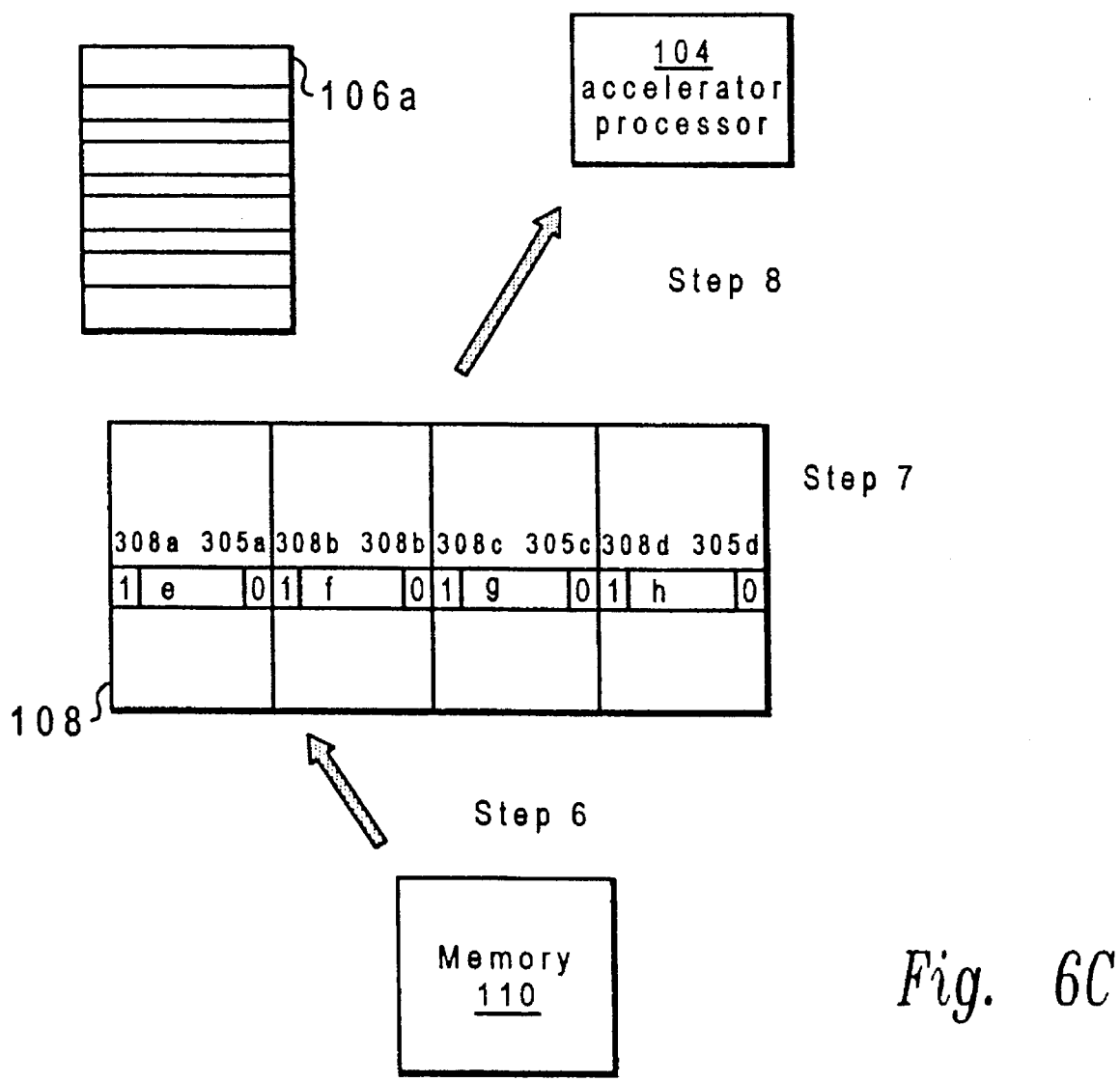

FIGS. 6A, 6B, and 6C illustrate such a sequence of accesses and their results. At the end, if the CPU 102a of cache 106a accesses one of lines a, b, c, or d, a miss will occur in cache 106a.

In FIG. 6A, accelerator processor 104 sends requests to cache memory 108 to read e, f, g, and h in a congruence class (step 1). e, f, g, and h have the same congruence class address as a, b, c, and d which reside in cache 106a. Next, in FIG. 6B, cache memory 108 makes request to purge entries a–d in cache memory 106a (step 2). In response, cache memory 106a purges these entries and sends replies back to cache memory 108 acknowledging the purging of these entries (step 3). As a result, inclusion bit 305a is reset and memory 110 is informed of the purging of these entries (step 4). Miss requests are made to memory 110 for entries e–h (step 5). In response memory 110 returns these entries to cache memory 108 (step 6). Cache memory 108 stores entries e–h and sets valid bits 308a–308d (step 7). Afterwards, the data e–h is returned to accelerator processor 104 (step 8).

While the invention has been particularly shown and described with reference to a preferred embodiment, it will be understood by those skilled in the art that various changes in form and detail may be made therein without departing from the spirit and scope of the invention.

What is claimed is:

1. A method for optimizing performance of a data processing system having a first processor connected to a first cache, and a second processor connected to a second cache, wherein the second cache is connected to the first cache and the second cache functions as a second level cache for the first processor and functions as a first level cache for the second processor, the method comprising:

responsive to a miss in the second cache when the second cache is accessed by the second processor:
selecting a set in the second cache for replacement;
determining whether the selected set is present in both the first cache and second cache;
determining whether the selected set is the only set in the first cache; and
replacing the selected set in response to a determination that the selected set is not the only set found both in the first cache and the second cache.

2. The method of claim 1, wherein the selecting step includes determining the least recently used set in the second cache.

3. An apparatus for providing balanced cache performance in a data processing system comprising:

a first processor;

a second processor;

a first cache memory connected to the first processor, wherein the first cache memory serves as a first level cache for the first processor;

a second cache memory connected to the first cache memory, and to the second processor, wherein the second cache memory serves as a second level cache for the first processor and as a first level cache for the second processor, and wherein the second cache includes a plurality of lines organized into congruence classes such that a congruence class contains a fixed number of lines and between the first and second level caches, an inclusive property is maintained such that each line in the first cache memory also is found in the second cache memory; and a control circuit connected to the second level cache, wherein the control circuit prevents replacement from a selected congruence class in the second level cache, of a last line within said selected congruence class within the second level cache with a level one cache inclusion in response to a miss when the second processor accesses the second cache memory such that at least one line within the selected congruence class remains within the first cache memory.

4. An apparatus for providing balanced cache performance in a data processing system comprising:

a first processor;

a second processor;

a first cache memory connected to the first processor, wherein the first cache memory serves as a first level cache for the first processor;

a second cache memory connected to the first cache memory and to the second processor, wherein the second cache memory serves as a second level cache for the first processor and as first level cache for the second processor and wherein the second cache memory is organized as a plurality of lines grouped into cache congruence classes, each congruence class being divided into multiple sets such that each set contains one line per congruence class and between the first and second level caches an inclusive property is maintained such that each line in the first cache memory also is found in the second cache memory; and a control circuit connected to the second level cache, wherein the control circuit prevents invalidating, in the second cache memory, in response to a miss by the second processor, of a last line in a congruence class within the second cache memory which is also contained in the first cache memory such that at least one line within the congruence class remains within the first cache memory.

5. The apparatus of claim 4, wherein, responsive to a miss by the second processor, said control circuit:

selects a set for replacement using a preselected replacement method; and selects a second set using said preselected replacement method in response to a determination that the selected set from the congruence class is the only set in that congruence class, in the first cache memory.

6. The apparatus of claim 5, wherein the first set is a least recently used set.

7. The apparatus of claim 5, wherein the second set is a next least recently used set.

8. The apparatus of claim 5, wherein the first set is selected if the first set is not only set inclusive.

9. The apparatus of claim 5, wherein the second set is selected if the second set is only set inclusive.

10. The apparatus of claim 5, wherein the preselected replacement method is a least recently used method.

11. The apparatus of claim 5, wherein the control circuit includes an input, wherein the input provides information allowing a determination as to whether a set residing in the second cache memory resides in the first cache.

12. The apparatus of claim 11, wherein the second cache memory is connected to a main memory.

13. The apparatus of claim 12, wherein the first processor is a central processing unit.

14. The apparatus of claim 13, wherein the second processor is an accelerator processor.

15. The apparatus of claim 4 further comprising a third processor with a cache memory connected to the second cache memory.

16. An apparatus for providing improved cache performance in a data processing system, the data processing system including a first processor, a second processor, a first cache memory connected to the first processor, wherein the first cache memory serves as a first level cache for the first processor, a second cache memory connected to the first cache memory, wherein the second cache memory serves as a second level cache for the first processor, and as a first level cache for the second processor, and wherein the second cache includes a plurality of lines organized into cache congruence classes, each congruence class being divided into sets, the apparatus comprising:

means for, in response to a miss by the second processor, preventing invalidation, in the second cache memory, of all lines also in the first cache memory that are in a congruence class in the second cache memory;

first selection means, responsive to a miss by the second processor, for selecting a set for replacement using a preselected replacement method; and second selection means, responsive to a miss by the second processor, for selecting a second set using a preselected replacement method in response to a determination that the selected set from the congruence class is the only set in that congruence class in the first cache memory.

17. An apparatus for optimizing performance of a data processing system having a first processor connected to a first cache, and a second processor connected to a second cache, wherein the second cache is connected to the first cache and the second cache functions as a second level cache for the first processor and functions as a first level cache for the second processor, the apparatus comprising:

selection means, responsive to a miss when the second cache is accessed by the second processor, for selecting a set in the second cache for replacement;

determining whether the selected set is present in both the first cache and second cache; and replacement means, responsive to a miss when the second cache is accessed by the second processor, for replacing the selected set in response to a determination that the selected set is not the only set found both in the first cache and the second cache.

* * * * *